US008819609B2

(12) United States Patent
Lisart et al.

(10) Patent No.: US 8,819,609 B2
(45) Date of Patent: Aug. 26, 2014

(54) COUNTERMEASURE METHOD AND DEVICE FOR PROTECTING DATA CIRCULATING IN AN ELECTRONIC MICROCIRCUIT

(71) Applicant: STMicroelectronics (Rousset) SAS, Rousset (FR)

(72) Inventors: Mathieu Lisart, Aix en Provence (FR); Fabrice Marinet, Chateauneuf le Rouge (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 13/625,697

(22) Filed: Sep. 24, 2012

(65) Prior Publication Data

US 2013/0015900 A1  Jan. 17, 2013

Related U.S. Application Data

(63) Continuation-in-part of application No. PCT/IB2011/051102, filed on Mar. 16, 2011.

(30) Foreign Application Priority Data

Mar. 24, 2010 (FR) ...................................... 10 01176
Mar. 24, 2010 (FR) ...................................... 10 01177

(51) Int. Cl.
| G06F 17/50 | (2006.01) |
| G06K 19/073 | (2006.01) |
| G06F 21/72 | (2013.01) |
| H04L 9/00 | (2006.01) |
| H01L 23/00 | (2006.01) |

(52) U.S. Cl.
CPC ............. *H04L 9/004* (2013.01); *H04L 2209/12* (2013.01); *G06K 19/07309* (2013.01); *H01L 23/576* (2013.01); *G06F 21/72* (2013.01)
USPC .......................................... 716/120; 716/123

(58) Field of Classification Search
USPC .................................................. 716/118–125
See application file for complete search history.

(56) References Cited

U.S. PATENT DOCUMENTS

| 6,320,770 | B1 | 11/2001 | Feuser |
| 6,419,159 | B1 | 7/2002 | Odinak |
| 6,745,331 | B1 | 6/2004 | Silverbrook |
| 6,867,637 | B2 | 3/2005 | Miyazaki et al. |
| 6,967,522 | B2 | 11/2005 | Chandrakasan et al. |
| 7,002,397 | B2 | 2/2006 | Kubo et al. |
| 8,116,050 | B2 | 2/2012 | Nagasawa et al. |
| 2003/0133241 | A1 | 7/2003 | Feuser et al. |
| 2004/0025135 | A1* | 2/2004 | Hart et al. ........................ 716/16 |
| 2004/0143747 | A1 | 7/2004 | Eckstein et al. |

(Continued)

OTHER PUBLICATIONS

Bar-El, H. et al., "The Sorcerer's Apprentice Guide to Fault Attacks," Proceedings of the IEEE 94(2):370-382, Feb. 2006.

*Primary Examiner* — Binh Tat
(74) *Attorney, Agent, or Firm* — Seed IP Law Group PLLC

(57) ABSTRACT

The disclosure relates to a countermeasure method in an electronic microcircuit, comprising successive process phases executed by a circuit of the microcircuit, and adjusting a power supply voltage between power supply and ground terminals of the circuit, as a function of a random value generated for the process phase, at each process phase executed by the circuit.

24 Claims, 3 Drawing Sheets

(56) References Cited

U.S. PATENT DOCUMENTS

| | | | |
|---|---|---|---|
| 2005/0269657 A1* | 12/2005 | Dupuis | 257/446 |
| 2006/0087909 A1* | 4/2006 | Okuda et al. | 365/233 |
| 2006/0156039 A1 | 7/2006 | Deveaud et al. | |
| 2007/0126100 A1 | 6/2007 | Mizuno et al. | |
| 2007/0171588 A1 | 7/2007 | Gehle et al. | |
| 2009/0174031 A1* | 7/2009 | Wang et al. | 257/532 |
| 2009/0251168 A1 | 10/2009 | Lisart et al. | |

* cited by examiner

COUNTERMEASURE METHOD AND DEVICE FOR PROTECTING DATA CIRCULATING IN AN ELECTRONIC MICROCIRCUIT

BACKGROUND

1. Technical Field

The present disclosure relates to a countermeasure method for protecting sensitive data circulating in an electronic microcircuit, against attacks aimed to discover these data. It also relates to a microcircuit portable device such as a chip card, implementing the method.

2. Description of the Related Art

Sensitive data may be in particular encryption or decryption keys, and more generally cryptographic data used or elaborated during cryptographic calculations, such as intermediate data of such calculations, and identifiers which must be kept secret.

Microcircuit devices using sensitive data are sometimes subjected to attacks which aim is to determine these data. Among the known attacks, the attacks of SPA (Simple Power Analysis) or DPA (Differential Power Analysis) type consist in taking numerous current and voltage measures coming in and going out of the microcircuit during a program execution or data processing by the microcircuit, with different input data. The measures obtained are used by a statistical analysis to deduce therefrom protected data, processed or used by the microcircuit. For the same aim, the attacks of EMA (Electromagnetic Analysis) and DEMA (Differential Electromagnetic Analysis) type are based on the analysis of the electromagnetic radiation emitted by the microcircuit.

Attacks by fault injection are also known, which consist in introducing disturbances into the microcircuit when it executes for example sensitive algorithms such as cryptographic algorithms, or which aim is to trigger the execution of a downloading routine emitting on a port the data it memorizes. Such disturbance may be made by applying to the microcircuit one or more brief lightings for example a laser beam, or one or more voltage peaks to one of the contacts thereof.

So as to fight against these attacks, which are various by nature, numerous solutions, very different from one another, have been brought. The disclosure more particularly relates to those that aim to protect data circulating in a microcircuit.

Various countermeasure techniques have been implemented so as to fight against these attacks. Thus, it is known to perform a logic masking by random number consisting in making random data pass through the logic circuits so as to cause logic gates which are not linked to the data to be protected to switch. It is also known to introduce random delays into a synchronous circuit or to implement double rail techniques making it possible to perform as many logic gates switching to 0 as switching to 1.

All these countermeasure techniques reveal to be demanding in terms of circuit size, computing speed and electrical consumption. In addition, if these techniques allow the robustness of circuits against attacks to be improved, they have faults.

BRIEF SUMMARY

One embodiment is a method that protects circuits handling secret data against attacks by signature analysis, without substantially increasing the complexity or electrical consumption thereof.

Some embodiments relate to a countermeasure method in an electronic microcircuit, the method comprising successive process phases executed by a circuit of the microcircuit, the method comprising adjusting a power supply voltage between power supply and ground terminals of the circuit, as a function of a random value generated for the process phase, at each process phase executed by the circuit, or modulating the power supply voltage by an alternating signal having an equiprobable distribution and a period corresponding to the duration of one of more successive process phases.

According to one embodiment, the method comprises: forming the microcircuit in a substrate, forming in the substrate a well electrically isolated from the substrate, forming the power supply or ground terminal of the circuit in the isolated well, and at each process phase executed by the circuit, adjusting the voltage between the power supply and ground terminals of the circuit, in relation to a power supply voltage of the microcircuit and a ground of the substrate, as a function of a random value generated for the process phase.

According to one embodiment, adjusting the power supply voltage between the power supply and ground terminals of the circuit is performed in a determined range as a function of: variations of the power supply voltage resulting from variations of the microcircuit performances linked to variations of the ambient temperature and variations of manufacturing conditions of the microcircuit, variations of the power supply voltage and ground voltages of the microcircuit as a function of the extent of the microcircuit activity, and minimum voltages allowing a switching of N-channel and P-channel transistors of the microcircuit to be performed.

According to one embodiment, a bias voltage between the ground terminal of the circuit and a ground terminal of the microcircuit is adjusted as a function of a random value, the voltage difference between a power supply voltage of the microcircuit and a power supply terminal of the circuit being fixed.

According to one embodiment, adjusting the power supply voltage between the power supply and ground terminals of the circuit is performed in a range included between −5% to +5% of the power supply voltage of the microcircuit.

According to one embodiment, the voltage difference between a power supply terminal of the circuit and a power supply voltage of the microcircuit is adjusted as a function of a random value, the voltage between the ground terminal of the circuit and a ground terminal of the microcircuit being fixed.

According to one embodiment, adjusting the power supply voltage between the power supply and ground terminals of the circuit is performed in a range included between −5% to +5% around the power supply voltage of the microcircuit.

According to one embodiment, adjusting the power supply voltage between the power supply and ground terminals of the circuit is performed with an adjusting step between 0.05 to 0.3% of the power supply voltage of the microcircuit.

Some embodiments also relate to a microcircuit comprising a circuit executing successive process phase, the circuit comprising power supply and ground terminals and being associated to a power supply circuit configured to implement the method such as previously defined.

According to one embodiment, the microcircuit comprises several circuits, each comprising power supply and ground terminals and each associated to a power supply circuit implementing the method such as previously described.

Some embodiments also relate to a microcircuit portable device comprising a microcircuit such as previously defined.

BRIEF DESCRIPTION OF THE SEVERAL VIEWS OF THE DRAWINGS

Embodiments of the disclosure will be described hereinafter, in relation with, but not limited to the appended figures wherein.

DETAILED DESCRIPTION

Figure 1:
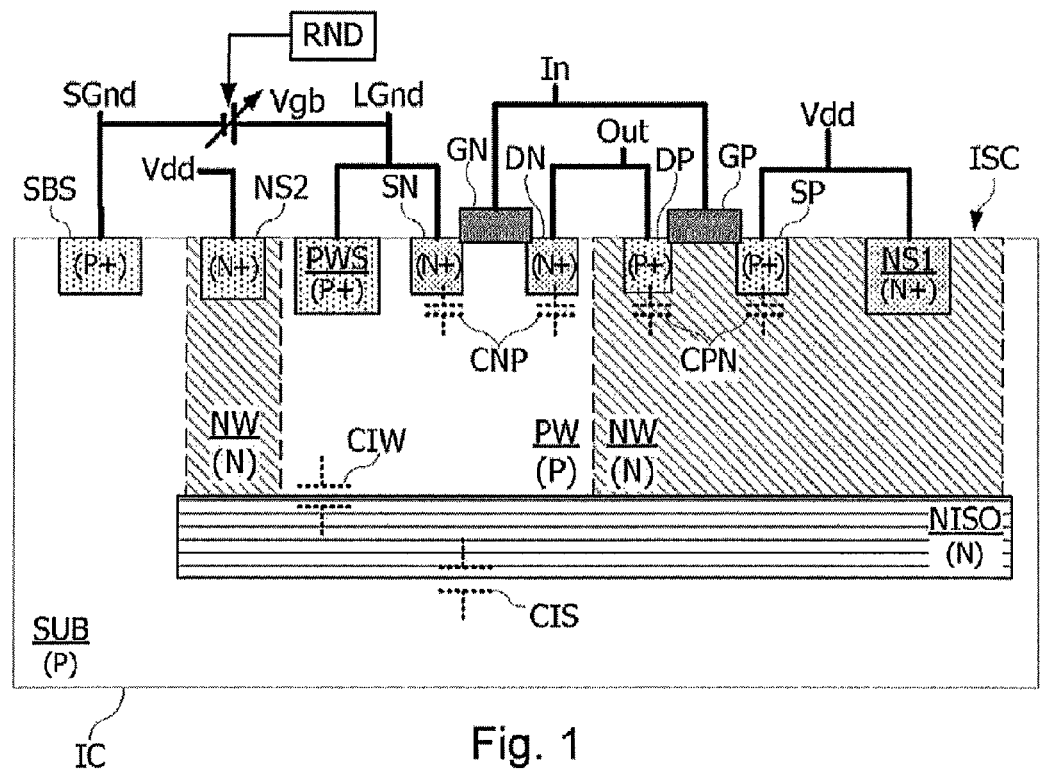
FIG. 1 schematically shows a cross-section of a substrate in which an integrated circuit is formed.

FIG. 1 shows an integrated circuit IC comprising a substrate SUB in a semiconductor material of P-type conductivity in which a circuit ISC is formed. The substrate SUB comprises a P+ doped region SBS forming a substrate connection connected to a substrate ground SGnd. The circuit ISC comprises an embedded well NISO of N-type conductivity and a well NW of N-type conductivity formed in the substrate until reaching the well NISO. The well NW is formed so as to encircle an area of the substrate thus forming a well PW of P-type conductivity. The well PW is thus isolated from the substrate SUB by the wells NISO and NW. The well NISO forms with the well PW a capacitance CIW, and with the substrate SUB a capacitance CIS. The presence of the capacitances CIW, CIS allows the noise on the ground SGnd of the substrate SUB and the electromagnetic radiation emitted by the circuit to be reduced, in particular in the band from 800 MHz to 1 GHz.

The well NW comprises N+ doped regions NS1, NS2 forming well connections intended to receive the power supply voltage Vdd of the circuit. The well NW also comprises P+ doped regions DP, SP forming the drain and the source of a P-channel CMOS transistor comprising a gate GP formed above an area forming the transistor channel, between the source SP and DP regions. The well PW comprises a P+ doped region PWS forming a well connection intended to be connected to the ground and two N+ doped regions SN, DN forming the source and the drain of a N-channel CMOS transistor comprising a gate GN formed above an area between the source SN and drain DN regions. Each of the gates GP, GN comprise a conductive layer overlying a thin dielectric layer on the substrate. The areas between a P+ doped region and a N+ doped region comprise a trench filled in with an insulating material (not shown), formed in the substrate to isolate the P+ doped regions from the N+ doped regions. The drain DN, DP and source SN, SP regions of the transistors, form with the wells NW and PW capacitances CPN, CNP. In the example of FIG. 1, the N-channel and P-channel transistors are interconnected so as to form an inverter. Thus, the source SP receives the power supply voltage Vdd, and the source SN is connected to the ground connection PWS. An input In of the inverter is connected to the gates SN and SP, and an output Out of the inverter is connected to the drains DN, DP.

According to one embodiment, the ground connection PWS of the well PW is not connected to the substrate ground SGnd, but forms a local ground LGnd of the circuit ISC. The local ground LGnd receives a bias voltage Vgb in relation to the substrate ground SGnd, which may be adjusted as a function of a random value RND between process phases executed by the circuit ISC. Thus, the circuit ISC is powered by a power supply voltage equal to Vdd−Vgb. Adjusting the bias voltage Vbg of the local ground LGnd may be performed in a range spreading from 0 to a value around 5% of the power supply voltage Vdd of the circuit ISC, for example from 0 to 4% of the voltage Vdd.

Such variations of the power supply voltage of the circuit ISC disturb the statistical analyses made during attacks SPA, EMA, DPA, DEMA which aim is to discover secret data handled by the circuit ISC.

The maximum extent of the adjusting range of the bias voltage Vgb may be chosen so as to take into account different voltages relative to the integrated circuit IC operation and features. Thus, the maximum extent of the adjusting range of the bias voltage Vgb may be chosen so as to comply with the threshold voltages of a N-channel transistor and a P-channel transistor of the integrated circuit IC, with the power supply voltage Vdd and with the voltage drops which occur in the circuits of the integrated circuit when they are active. The voltages taken into account are considered with an error margin linked to performance variations of the integrated circuit resulting from ambient temperature variations or process corners of the integrated circuit.

Figure 2:
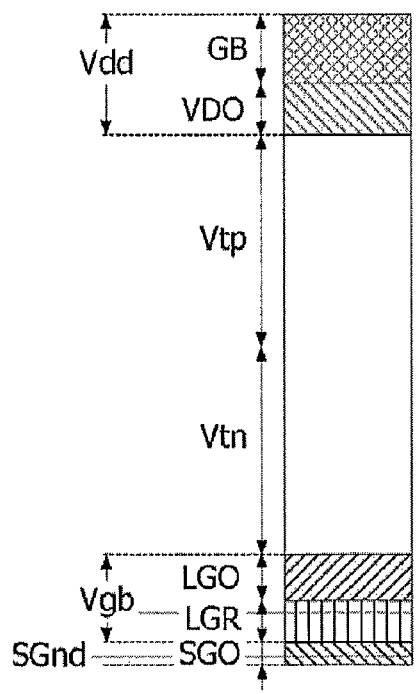
FIG. 2 shows on a scale different voltage levels to be considered in an analysis of the integrated circuit operation.

FIG. 2 shows on a scale different voltage values and ranges to be considered in the integrated circuit IC operation. The scale of FIG. 2 comprises, from the top of the scale, voltage ranges GB, VDO, LGO, LGR then SGO at the bottom of the scale. The voltage range GB delineates the variations of the power supply voltage Vdd resulting from variations of the integrated circuit performances linked to variations of the ambient temperature and variations of the manufacturing conditions of the integrated circuit. The voltage range VDO delineates the variations of the voltage Vdd as a function of the extent of the integrated circuit activity. The range VDO corresponds to the drop of the voltage Vdd in the internal resistors of the integrated circuit. The range LGO delineates the variations of the bias voltage of the local ground of the circuit ISC as a function of the extent of the integrated circuit IC activity. The range LGR delineates the maximum adjusting extent of the bias voltage Vgb of the local ground of the circuit ISC. The range SGO delineates the variations of the voltage of the substrate SUB ground as a function of the extent of the integrated circuit IC activity.

The width of the range LGR may be chosen so that the voltage difference between the ranges VDO and LGO is superior or equal to the sum of the minimum voltages making it possible to guarantee the switching of the N-channel and P-channel transistors of the integrated circuit IC, i.e., the sum of the threshold voltages Vtn of a N-channel transistor and Vtp of a P-channel transistor, to which an overdrive of around 10% is added.

In the 90 nm integration technology, the rated power supply voltage is of around 1.3 V (with a possible difference of 10%). At the top of the scale of FIG. 2, the ranges GB and VDO have spreads of around 70 mV and 50 mV. The spreads of the threshold voltages Vtp and Vtn are on average of 500 mV and 475 mV. A voltage range of around 1025 mV should therefore be provided to allow the N-channel and P-channel transistors of the circuit ISC to switch. The ranges LGO and SGO have spreads of 50 mV and 25 mV. Therefore there is around 50 mV (with a possible difference of 10%) for the adjusting range LGR of the voltage Vgb. In the 0.18 μm integration technology, the adjusting range of the voltage Vgb may have an extent of 100 to 200 mV.

According to one embodiment, the value allocated to the bias voltage Vgb may be randomly chosen among several dozens of different values to avoid an averaging effect, for example with an adjusting step chosen between 0.05 and 0.3%. If the adjusting range of the voltage Vgb spreads from 0 to 4% of the voltage Vdd, around forty values correspond to an adjusting step of 0.1% of the voltage Vdd. In the example of the 90 nm integration technology, a step of 0.1% of the voltage Vdd corresponds to around 1.3 mV (with a possible difference of 10%).

According to one embodiment, the bias voltage Vgb is randomly modified when the circuit ISC is in an activation waiting state between two process phases executed by the circuit. This state is for example detected by monitoring a "ready" signal supplied by the circuit ISC. The bias voltage Vgb may also be modified at the beginning of a process phase such as a round of an encryption algorithm for example complying with the DES (Digital Encryption System) or AES (Advanced Encryption System) standard. In that case, it may be provided a waiting delay before starting the process phase to allow the power supply voltage of the circuit ISC to stabilize. It may also be provided to change the value of the power supply voltage of the circuit ISC from the end of a process phase, i.e., as soon as the circuit is waiting for activation.

According to one embodiment, the bias voltage Vgb may be negative, so that the adjusting range of the voltage Vgb may spread from around −5 to +5% of the power supply voltage Vdd, for example from −4% to +4% of the power supply voltage Vdd. The number of adjusting steps may be of several dozens, for example kept at around forty or doubled.

According to another embodiment, the bias voltage may be modulated in the range from 0 to 5% by an alternating signal, for example sinusoidal, having an equiprobable distribution and a period corresponding to the duration of one or more successive process phases, for example between some hundreds of nanoseconds and some microseconds.

Figure 3:
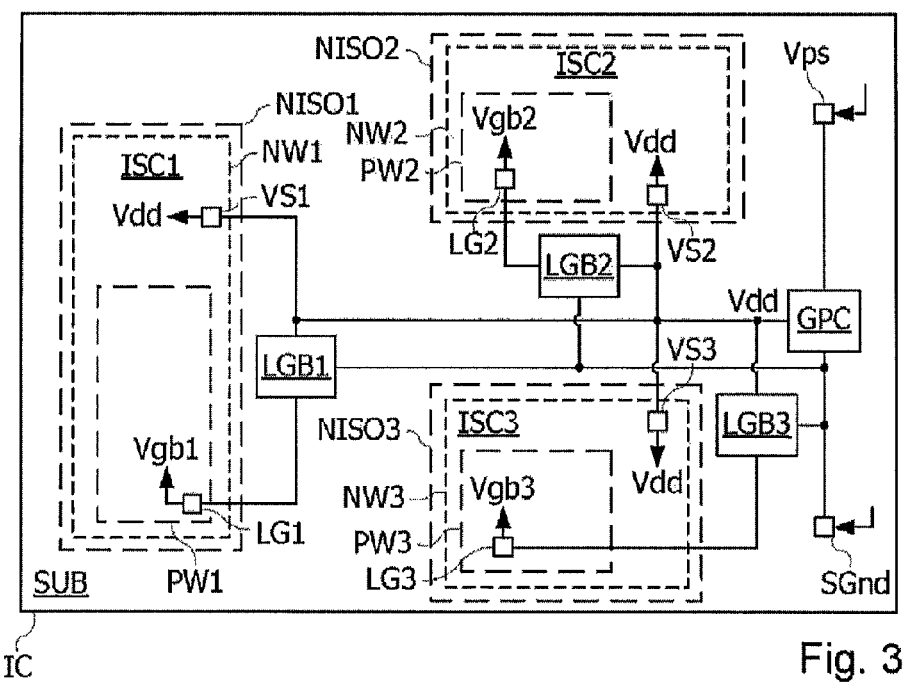
FIG. 3 is a schematic top view of the integrated circuit, according to one embodiment, FIG. 4 schematically shows a power supply circuit of the integrated circuit, FIG. 5 schematically shows a bias circuit of the integrated circuit, according to one embodiment, FIG. 6 schematically shows a bias circuit of the integrated circuit, according to another embodiment, FIG. 7 schematically shows a top view of an integrated circuit, according to another embodiment, FIG. 8 schematically shows a power supply circuit of the integrated circuit of FIG. 7.

FIG. 3 shows the integrated circuit IC, according to one embodiment. In FIG. 3, the integrated circuit IC comprises several circuits formed in the substrate SUB, several circuits ISC1, ISC2, ISC3 of which may handle sensitive data. The integrated circuit IC comprises a global power supply circuit GPC supplying to a power supply terminal VS1, VS2, VS3 of the various circuits of the integrated circuit, the power supply voltage Vdd in relation to the ground of the substrate SGnd, from an external power supply voltage Vps.

According to one embodiment, each of the circuits ISC1, ISC2, ISC3 comprises an isolated well of P-type conductivity PW1, PW2, PW3 encircled by a well of N-type conductivity NW1, NW2, NW3, and isolated from the rest of the substrate SUB by an embedded isolating well NISO1, NISO2, NISO3. The isolated well PW1, PW2, PW3 of each of the circuits ISC1, ISC2, ISC3 comprises a local ground connection LG1, LG2, LG3. Each circuit ISC1, ISC2, ISC3 is associated with a bias circuit LGB1, LGB2, LGB3 supplying a bias voltage Vgb1, Vgb2, Vgb3 of the local ground LG1, LG2, LG3 in relation to the ground of the substrate SGnd. Thus, each circuit ISC1, ISC2, ISC3 is powered between a power supply terminal VS1, VS2, VS3 receiving the power supply voltage Vdd and the local ground thereof, by a power supply voltage equal to Vdd−Vgb<i> (where i is equal to 1, 2 or 3). Each circuit LGB1, LGB2, LGB3 supplies one of the bias voltages Vgb1, Vgb2, Vgb3 determined as a function of a random value. Adjusting the bias voltage is made at a time where the circuit ISC1, ISC2, ISC3 is inactive or before a process phase, by providing, if necessary, a waiting phase before triggering the process phase, to allow the power supply voltage (Vdd−Vgb<i>) to stabilize. The inactivity state is for example detected by monitoring a "ready" signal supplied by the circuit ISC1, ISC2, ISC3. As the bias voltages Vgb1, Vgb2, Vgb3 of the circuits ISC1, ISC2, ISC3 are supplied in wells PW1, PW2, PW3 isolated from the substrate SUB by the wells NW1, NW2, NW3 and NISO1, NISO2, NISO3, they may differ at a given time where the circuits ISC1, ISC2, ISC3 are all inactive. Each circuit LGB1, LGB2, LGB3 may therefore have its own random number generator to adjust its resistor R4.

Figure 4:
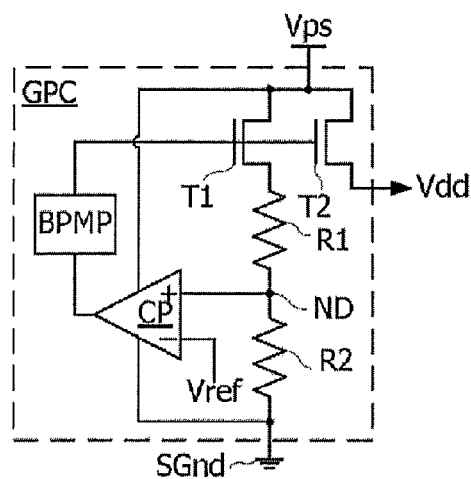

FIG. 4 shows an example of power supply circuit GPC of the integrated circuit IC. The circuit GPC comprises two N-channel MOS transistors T1, T2, two resistors R1, R2, a comparator CP and a step-up voltage circuit BPMP. The drain of the transistors T1, T2 receives the external voltage Vps. The source of the transistor T1 is linked to the substrate ground SGnd through the resistors R1 and R2 connected in series. The junction node ND between the resistors R1, R2 is connected to a direct input of the comparator CP. The comparator CP comprises an inverting input receiving a constant reference voltage Vref, for example fixed at 0.8 V. The voltage Vref is substantially constant, i.e., in particular independent of the ambient temperature of the integrated circuit and the manufacture conditions thereof. The voltage Vref may be for example supplied by a bandgap reference circuit. The output of the comparator CP is connected to an input of the circuit BPMP. The output of the circuit BPMP is connected to the gates of the transistors T1, T2. The source of the transistor T2 supplies the power supply voltage Vdd. The circuit BPMP for example made by a charge pump, supplies a voltage equal to Vdd +Vtn, where Vtn is the threshold voltage of the transistors T1, T2. The comparator CP regulates the voltage Vdd by keeping the voltage at the node ND substantially equal to the voltage Vref. The value of the voltage Vdd is defined by the values of the resistors R1, R2.

Figure 5:
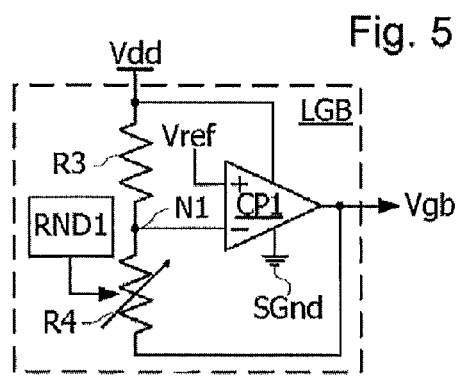

FIG. 5 shows an embodiment of each of the bias circuits LGB1, LGB2, LGB3. In FIG. 5, the circuit LGB comprises two resistors R3, R4, a comparator CP1 and a random number generation circuit RND1. The comparator CP1 is powered between the power supply voltage Vdd and the substrate ground SGnd. The comparator CP1 receives on an inverting input a reference voltage Vref. The resistors R3, R4 are connected in series between the power supply voltage Vdd and the output of the comparator CP1 which supplies the bias voltage Vgb. The junction node N1 between the two resistors R3, R4 is connected to a direct input of the comparator CP1. Thus, the comparator CP1 regulates the voltage Vgb so that the voltage at the node N1 is kept equal to the reference voltage Vref. The voltage Vgb supplied by the circuit LGB may therefore be calculated using the following equation:

$$Vgb = Vref - (Vdd - Vref)R4/R3 \quad (1)$$

One of the two resistors, for example the resistor R4 may be adjustable and controlled by the generator RND1, to adjust the bias voltage Vgb. In the 90 nm technology with the power supply voltage Vdd fixed at 1.3 V, and if Vref is fixed at 0.8 V and if Vgb varies between 0 and 50 mV, then the ratio R4/R3 of the values of the resistors R4 and R3 is adjustable between 1.6 and 1.5.

Conventionally, the adjustable resistor R4 may be made using several resistors connected in series, a switch being mounted in parallel to each resistor mounted in series. Each switch is controlled by a bit of a random word supplied by the generator RND1. To respect the equibrobability of the value allocated to the voltage Vgb, the resistors constituting the variable resistor may have as respective values for example R, 2R, 4R, 8R, . . . .

Figure 6:
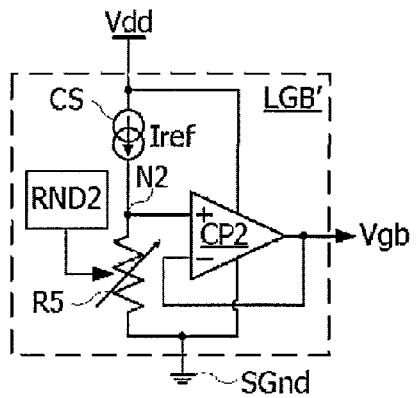

FIG. 6 shows another embodiment of each of the bias circuits LGB1, LGB2, LGB3. In FIG. 6, the circuit LGB' comprises a resistor R5, a comparator CP2, a current source CS and a random number generation circuit RND2. The current source CS is powered by the voltage Vdd and supplies a current Iref equal to the reference voltage Vref divided by a resistor R6 (not shown). The comparator CP2 is powered between the power supply voltage Vdd and the substrate ground SGnd. The resistor R5 is connected in series between the current source CS and the ground. The junction node N2 between the current source and the resistor R5 is connected to a direct input of the comparator CP2. The output of the comparator CP2 which supplies the bias voltage Vgb is looped on the inverting input thereof. Thus, the comparator CP2 regulates the voltage Vgb by keeping it equal to the voltage at the node N2. The voltage Vgb supplied by the circuit LGB may therefore be calculated using the following equation:

$$Vgb = R5 Iref = Vref \cdot R5/R6 \qquad (2)$$

In relation to the circuit LGB, the circuit LGB' has the advantage of not being sensitive to variations of the power supply voltage Vdd which may occur in particular when the integrated circuit IC is active due to voltage drops in the internal resistors of the circuit IC.

The resistor R5 may be adjustable and controlled by the generator RND2, to adjust the bias voltage Vgb. In the 90 nm technology with the power supply voltage Vdd fixed at 1.3 V, and if Vref is fixed at 0.1 V and if Vgb is adjustable between 1 mV and 50 mV, then the ratio R5/R6 of the values of the resistors R5 and R6 is adjustable between 1/100 and 1/2.

Figure 7:
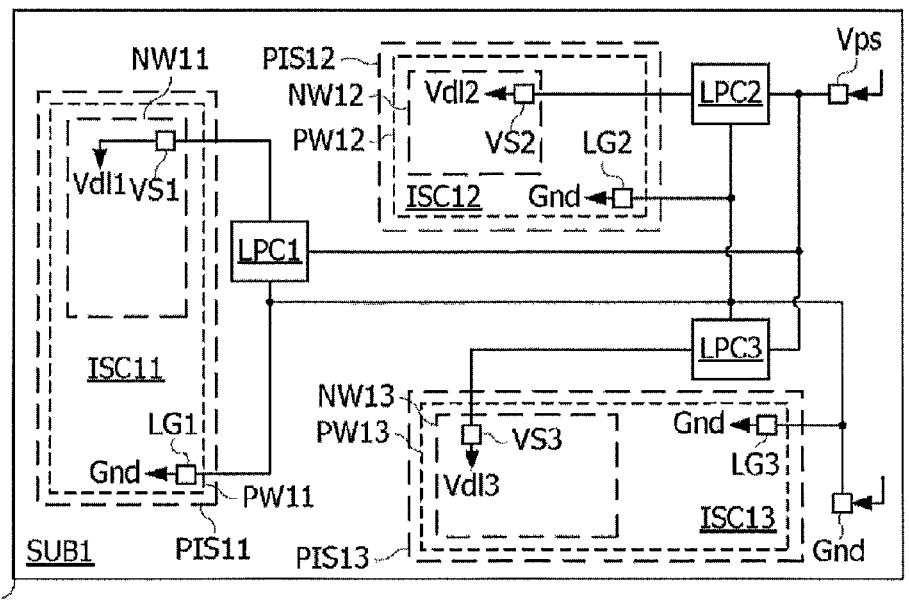

FIG. 7 shows an integrated circuit, according to another embodiment. In FIG. 7, the integrated circuit IC1 comprises several circuits formed in an N-conductivity substrate SUB1, including some circuits ISC11, ISC12, ISC13 handling sensitive data, such as secret data. The integrated circuit IC1 comprises a substrate ground Gnd, and receives an external power supply voltage Vps.

According to one embodiment, each of the circuits ISC1, ISC2, ISC3 comprises a well of N-type conductivity NW11, NW12, NW13 encircled by a well of P-type conductivity PW1, PW2, PW3, and isolated from the rest of the substrate SUB1 by an embedded isolating well PIS11, PIS12, PIS13. Each of the circuits ISC11, ISC12, ISC13 comprises a power supply terminal VS1, VS2, VS3 connected to a power supply circuit LPC1, LPC2, LPC3 supplying to the power supply terminal a power supply voltage Vdl1, Vdl2, Vdl3 different from the power supply voltage Vps. Thus, each circuit ISC11, ISC12, ISC13 is powered by the power supply terminal Vdl<i> (where i is equal to 1, 2 or 3). Each of the power supply voltages Vdl1, Vdl2, Vdl3 is adjusted as a function of a random value, so as to mask the activity of the circuit with regards to an attack which aim is to discover the data handled by the circuit. Adjusting the power supply voltage Vdl<i> of each circuit ISC11, ISC12, ISC13 is made at a time where the circuit is inactive or before a process phase, for example at the end of a process phase.

Figure 8:
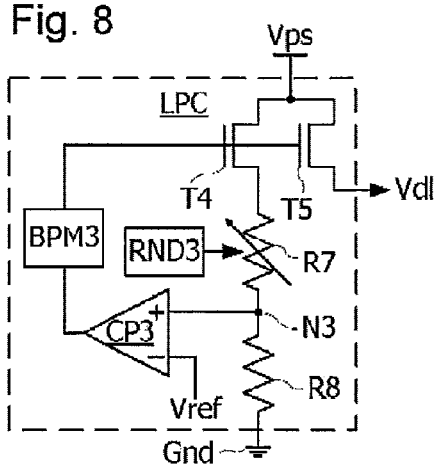

FIG. 8 shows an example embodiment of one of the bias circuits LPC1, LPC2, LPC3. In FIG. 8, the circuit LPC comprises two N-channel MOS transistors T4, T5, two resistors R7, R8, a comparator CP3, a voltage step up circuit BPM3 and a random number generation circuit RND3. The drain of the transistors T4, T5 receives the power supply voltage Vps. The source of the transistor T4 is linked to the substrate ground Gnd through the resistors R7 and R8 connected in series. The junction node N3 between the resistors R7, R8 is connected to a direct input of the comparator CP3. The comparator CP3 comprises an inverting input receiving a constant reference voltage Vref, for example fixed at 0.8 V. The output of the comparator CP3 is connected to an input of the circuit BPM3. The output of the circuit BPM3 is connected to the gates of the transistors T4, T5. The source of the transistor T5 supplies the power supply voltage Vdl of one of the circuits ISC11, ISC12, ISC13. The comparator CP3 regulates the voltage Vdl by keeping the voltage at the node N3 substantially equal to the voltage Vref. The value of the voltage Vdl is defined by the values of the resistors R7, R8. One of the two resistors R7, R8, for example the resistor R7 is adjustable and controlled by the circuit RND3. Thus, the comparator CP3 regulates the voltage Vdl which depends on the values of the resistors R7, R8, so that the voltage at the node N3 is kept equal to the reference voltage Vref.

Here again, adjusting the local power supply voltage Vdl may be performed in a range from 100% to a value around 95% of the power supply voltage Vps of the integrated circuit IC1, for example from 100 to 96% of the voltage Vps.

According to one embodiment, the power supply voltage Vdl may be adjusted in an adjusting range which may spread from around −5 to +5% of the power supply voltage Vps, for example from −4% to +4% around the power supply voltage Vps. The number of adjusting steps may be of several dozens, for example kept at around forty or doubled.

The maximum width of the adjusting range of the bias voltage Vdl may be chosen so as to comply with the sum of the threshold voltages of a N-channel transistor and a P-channel transistor of the integrated circuit IC, at the power supply voltage Vps and the voltage drops which occur in the circuits when they are active, formed in the substrate and the wells, these voltage values being considered with an error margin linked to performance variations of the integrated circuit resulting from ambient temperature variations or process corners of the integrated circuit. In the 90 nm integration technology, the rated value of the power supply voltage Vps is of around 1.3 V (with a possible difference of 10%). Adjusting the power supply voltage Vdl may be performed in a range between Vps or Vps+50 mV to around Vps−50 mV (with a possible difference of 10%). In the 0.18 µm integration technology, the adjusting range of the voltage Vdl may extend from a value comprised between Vps and Vps+200 mV to a value comprised between Vps−100 and Vps−200 mV.

According to one embodiment, the value allocated to the power supply voltage Vdl may be chosen among several dozens of different values to avoid an averaging effect, for example with an adjusting step chosen between 0.05 and 0.3%. If the adjusting range of the voltage Vdl spreads from 100% to 96%, around forty values correspond to an adjusting step of 0.1%.

According to one embodiment, the power supply voltage Vdl is randomly modified when the circuit ISC11, ISC12, ISC13 is inactive or before a process phase, by providing, if necessary, a waiting phase before triggering the process phase, to allow the power supply voltage (Vdl<i>) to stabilize. This state is for example detected by monitoring a "ready" signal supplied by the circuit ISC11, ISC12, ISC13. The power supply voltage Vdl may also be modified at the beginning of a process phase. In that case, it may be provided a waiting delay before starting the process phase to allow the power supply voltage Vdl to stabilize. As the power supply voltages Vdl1, Vdl2, Vdl3 of the circuits ISC11, ISC12, ISC13 are supplied in wells NW1, NW2, NW3 isolated from the substrate SUB by the wells PW1, PW2, PW3 and PIS11, PIS12, PIS13, they may differ at a given time where the circuits ISC11, ISC12, ISC13 are all active. Each circuit LPC1, LPC2, LPC3 may therefore have its own random number generator to adjust its resistor R7.

It will be clear to those skilled in the art that the present disclosure is susceptible of various embodiments and applications. Thus, the disclosure is not limited to a microcircuit comprising several circuits independently powered. The disclosure also applies to a microcircuit in which the whole power supply voltage is randomly adjusted at the beginning of a process phase. The power supply terminals of the microcircuit are therefore not necessarily formed in a well isolated from the rest of the substrate in which the microcircuit is formed.

In addition, if in the examples described, the voltage at the power supply terminal VG1, VG2, VG3 of one of the circuits ISC1, ISC2, ISC3 is equal to the power supply voltage Vdd of the integrated circuit, or if the voltage of the local ground LG1, LG2, LG3 of one of the circuits ISC11, ISC12, ISC13 is equal to that of the ground Gnd of the integrated circuit, admittedly, a constant voltage difference may be applied between these voltages without going out of the frame of the present disclosure.

Figure 9:
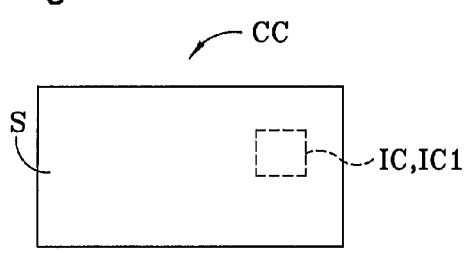
FIG. 9 is a chip card according to one embodiment of the present disclosure.

A microcircuit portable device according to one embodiment is shown in FIG. 9. In particular, the microcircuit portable device is a chip card CC that includes a support S that typically would be made of plastic, as is typical for chip cards. The chip card CC also includes an integrated circuit such as one of the integrated circuits IC, IC1 described above. Those skilled in the art will understand that a microcircuit portable device according to the present disclosure can be implemented using any portable device with a processor that is desired to be protected from hacking attempts.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of making an electronic microcircuit, comprising:
   forming a processing circuit configured to execute successive process phases, the forming including:
      forming in a substrate an isolated well electrically isolated from an underlying portion of the substrate; and
      forming a power supply terminal and a ground terminal of the processing circuit, wherein at least one of the power supply and ground terminals is formed in the isolated well; and
   forming a power supply circuit configured to, at or near each of the successive process phases, dynamically readjust a power supply voltage between the power supply and ground terminals of the processing circuit as a function of a randomly varying signal, wherein forming the power supply circuit includes forming the power supply circuit configured to adjust the power supply voltage between the power supply and ground terminals of the processing circuit in a determined range as a function of:
      variations of the power supply voltage resulting from variations of performances of the processing circuit linked to variations of an ambient temperature and variations of manufacturing conditions of the microcircuit,
      variations of the power supply voltage and ground voltages of the microcircuit as a function of an extent of activity of the microcircuit, and
      minimum voltages allowing a switching of N-channel and P-channel transistors of the microcircuit to be performed.

2. A method according to claim 1, wherein forming the power supply circuit includes forming the power supply circuit configured to:
   detect inactive phases between the successive active phases; and
   adjust the power supply voltage as a function of the randomly varying signal in response to detecting the inactive phases.

3. A method according to claim 1, wherein forming the power supply circuit includes forming the power supply circuit configured to adjust a bias voltage between the ground terminal of the circuit and a ground terminal of the microcircuit as a function of a random value, a voltage difference between a power supply voltage of the microcircuit and the power supply terminal of the processing circuit being fixed.

4. A method according to claim 3, wherein forming the power supply circuit includes forming the power supply circuit configured to adjust the power supply voltage between the power supply and ground terminals of the processing circuit is performed in a range included between −5% to +5% of the power supply voltage of the microcircuit.

5. A method according to claim 1, wherein forming the power supply circuit includes forming the power supply circuit configured to adjust the voltage difference between the power supply terminal of the processing circuit and a power supply voltage of the microcircuit as a function of a random value while a voltage between the ground terminal of the processing circuit and a ground terminal of the microcircuit is fixed.

6. A method according to claim 5, wherein forming the power supply circuit includes forming the power supply circuit configured to adjust the power supply voltage between the power supply and ground terminals of the processing in a range included between −5% to +5% around the power supply voltage of the microcircuit.

7. A method according to claim 1, wherein forming the power supply circuit includes forming the power supply circuit configured to adjust the power supply voltage between the power supply and ground terminals of the processing circuit with an adjusting step from 0.05 to 0.3% of the power supply voltage of the microcircuit.

8. A method according to claim 1, wherein the varying signal is an alternating signal having an equiprobable distribution and a period corresponding to a duration of one of more successive process phases.

9. A microcircuit comprising:
   a first processing circuit configured to execute first successive process phases and including power supply and ground terminals, wherein at least one of the power supply and ground terminals is formed in an isolated well of a substrate, the isolated well being electrically isolated from an underlying portion of the substrate; and
   a first power supply circuit coupled to the first processing circuit and configured to, at or near each of the processing phases, dynamically readjust a power supply voltage between the power supply and ground terminals of the processing circuit as a function of a random, first varying signal, wherein the first power supply circuit includes:
   a comparator having first and second input terminals and an output terminal, the first input terminal being configured to receive a reference voltage;
   first and second resistors coupled between the power supply terminal and the output terminal of the comparator, the first resistor being a variable transistor with a control terminal, and the first and second resistors being coupled to each other at the second input terminal of the comparator; and a random signal generator coupled to the control terminal of the first resistor and configured to generate a random signal to randomly vary a resistance of the first resistor.

10. A microcircuit according to claim 9, comprising:

a second processing circuit configured to execute second successive process phases and including power supply and ground terminals; and a second power supply circuit configured to, for each of the second successive processing phases, adjust a power supply voltage between the power supply and ground terminals of the second processing circuit as a function of a second varying signal.

11. A microcircuit according to claim 9, wherein the first power supply circuit is configured to detect inactive phases between the successive active phases of the first processing circuit and adjust the power supply voltage between power supply and ground terminals of the first processing circuit, as a function of the varying signal during the inactive phases between the successive process phases of the first processing circuit, in response to detecting the inactive phases.

12. A microcircuit portable device, comprising:

a support; and a microcircuit carried by the support and including:

a first processing circuit configured to execute first successive process phases and including power supply and ground terminals, wherein at least one of the power supply and ground terminals is formed in an isolated well of a substrate, the isolated well being electrically isolated from an underlying portion of the substrate; and a first power supply circuit coupled to the first processing circuit and configured to, for each of the processing phases, adjust a power supply voltage between the power supply and ground terminals of the processing circuit as a function of a first varying signal, wherein the first power supply circuit includes:

a comparator having first and second input terminals and an output terminal, the first input terminal being configured to receive a reference voltage;

first and second resistors coupled between the power supply terminal and the output terminal of the comparator, the first resistor being a variable transistor with a control terminal, and the first and second resistors being coupled to each other at the second input terminal of the comparator; and a random signal generator coupled to the control terminal of the first resistor and configured to generate a random signal to randomly vary a resistance of the first resistor.

13. A microcircuit portable device according to claim 12, wherein the microcircuit includes:

a second processing circuit configured to execute second successive process phases and including power supply and ground terminals; and a second power supply circuit configured to, for each of the second successive processing phases, adjust a power supply voltage between the power supply and ground terminals of the second processing circuit as a function of a second varying signal.

14. A microcircuit portable device according to claim 12, wherein the first power supply circuit is configured to detect inactive phases between the successive active phases of the first processing circuit and adjust the power supply voltage between power supply and ground terminals of the first processing circuit, as a function of the varying signal during the inactive phases between the successive process phases of the first processing circuit, in response to detecting the inactive phases.

15. A microcircuit comprising:

a first processing circuit configured to execute first successive process phases and including power supply and ground terminals, wherein at least one of the power supply and ground terminals is formed in an isolated well of a substrate, the isolated well being electrically isolated from an underlying portion of the substrate; and a first power supply circuit coupled to the first processing circuit and configured to, for each of the processing phases, adjust a power supply voltage between the power supply and ground terminals of the processing circuit as a function of a first varying signal, wherein the first power supply circuit includes:

a comparator having first and second input terminals and an output terminal, the first input terminal being configured to receive a reference voltage;

first and second resistors coupled between the power supply terminal and the output terminal of the comparator, the first resistor being a variable transistor with a control terminal, and the first and second resistors being coupled to each other at the second input terminal of the comparator; and a random signal generator coupled to the control terminal of the first resistor and configured to generate a random signal to randomly vary a resistance of the first resistor.

16. A microcircuit according to claim 15, comprising:

a second processing circuit configured to execute second successive process phases and including power supply and ground terminals; and a second power supply circuit configured to, for each of the second successive processing phases, adjust a power supply voltage between the power supply and ground terminals of the second processing circuit as a function of a second varying signal.

17. A microcircuit comprising:

a first processing circuit configured to execute first successive process phases and including power supply and ground terminals, wherein at least one of the power supply and ground terminals is formed in an isolated well of a substrate, the isolated well being electrically isolated from an underlying portion of the substrate;

a first power supply circuit coupled to the first processing circuit and configured to, for each of the processing phases, adjust a power supply voltage between the power supply and ground terminals of the processing circuit as a function of a first varying signal; and microcircuit power supply and ground terminals, wherein the first power supply circuit includes:

a comparator having first and second input terminals and an output terminal, the second input terminal being coupled to the output terminal;

a variable resistor and a current source coupled between the microcircuit power supply and ground terminals, the variable resistor having a control terminal, and the variable resistor and current source being coupled to each other at the first input terminal of the comparator; and a random signal generator coupled to the control terminal of the variable resistor and configured to generate a random signal to randomly vary a resistance of the variable resistor.

18. A microcircuit according to claim 17, comprising:
a second processing circuit configured to execute second successive process phases and including power supply and ground terminals; and
a second power supply circuit configured to, for each of the second successive processing phases, adjust a power supply voltage between the power supply and ground terminals of the second processing circuit as a function of a second varying signal.

19. A microcircuit comprising:
a first processing circuit configured to execute first successive process phases and including power supply and ground terminals, wherein at least one of the power supply and ground terminals is formed in an isolated well of a substrate, the isolated well being electrically isolated from an underlying portion of the substrate;
a first power supply circuit coupled to the first processing circuit and configured to, for each of the processing phases, adjust a power supply voltage between the power supply and ground terminals of the processing circuit as a function of a first varying signal; and
microcircuit power supply and ground terminals, wherein the first power supply circuit includes:
a comparator having first and second input terminals and an output terminal, the first input terminal being coupled to the output terminal;
a first resistor, a second resistor, and a first transistor coupled in series between the microcircuit power supply and ground terminals, the first resistor being a variable transistor with a control terminal, and the first and second resistors being coupled to each other at the second input terminal of the comparator, the first transistor having a control terminal;
a random signal generator coupled to the control terminal of the variable resistor and configured to generate a random signal to randomly vary a resistance of the variable resistor;
a second transistor coupled between the microcircuit power supply terminal and the power supply terminal of the first processing circuit, the second transistor having a control terminal; and
a voltage step up circuit coupled between the output of the comparator and the control terminals of the first and second transistors.

20. A microcircuit according to claim 19, comprising:
a second processing circuit configured to execute second successive process phases and including power supply and ground terminals; and
a second power supply circuit configured to, for each of the second successive processing phases, adjust a power supply voltage between the power supply and ground terminals of the second processing circuit as a function of a second varying signal.

21. A microcircuit portable device, comprising:
a support; and
a microcircuit carried by the support and including:
a first processing circuit configured to execute first successive process phases and including power supply and ground terminals, wherein at least one of the power supply and ground terminals is formed in an isolated well of a substrate, the isolated well being electrically isolated from an underlying portion of the substrate;
a first power supply circuit coupled to the first processing circuit and configured to, for each of the processing phases, adjust a power supply voltage between the power supply and ground terminals of the processing circuit as a function of a first varying signal; and
microcircuit power supply and ground terminals, wherein the first power supply circuit includes:
a comparator having first and second input terminals and an output terminal, the second input terminal being coupled to the output terminal;
a variable resistor and a current source coupled between the microcircuit power supply and ground terminals, the variable resistor having a control terminal, and the variable resistor and current source being coupled to each other at the first input terminal of the comparator; and
a random signal generator coupled to the control terminal of the variable resistor and configured to generate a random signal to randomly vary a resistance of the variable resistor.

22. A microcircuit portable device according to claim 21, wherein the first power supply circuit is configured to detect inactive phases between the successive active phases of the first processing circuit and adjust the power supply voltage between power supply and ground terminals of the first processing circuit, as a function of the varying signal during the inactive phases between the successive process phases of the first processing circuit, in response to detecting the inactive phases.

23. A microcircuit portable device, comprising:
a support; and
a microcircuit carried by the support and including:
a first processing circuit configured to execute first successive process phases and including power supply and ground terminals, wherein at least one of the power supply and ground terminals is formed in an isolated well of a substrate, the isolated well being electrically isolated from an underlying portion of the substrate;
a first power supply circuit coupled to the first processing circuit and configured to, for each of the processing phases, adjust a power supply voltage between the power supply and ground terminals of the processing circuit as a function of a first varying signal; and
microcircuit power supply and ground terminals, wherein the first power supply circuit includes:
a comparator having first and second input terminals and an output terminal, the first input terminal being coupled to the output terminal;
a first resistor, a second resistor, and a first transistor coupled in series between the microcircuit power supply and ground terminals, the first resistor being a variable transistor with a control terminal, and the first and second resistors being coupled to each other at the second input terminal of the comparator, the first transistor having a control terminal;
a random signal generator coupled to the control terminal of the variable resistor and configured to generate a random signal to randomly vary a resistance of the variable resistor;
a second transistor coupled between the microcircuit power supply terminal and the power supply terminal of the first processing circuit, the second transistor having a control terminal; and
a voltage step up circuit coupled between the output of the comparator and the control terminals of the first and second transistors.

24. A microcircuit portable device according to claim 23, wherein the first power supply circuit is configured to detect inactive phases between the successive active phases of the first processing circuit and adjust the power supply voltage between power supply and ground terminals of the first processing circuit, as a function of the varying signal during the inactive phases between the successive process phases of the first processing circuit, in response to detecting the inactive phases.

* * * * *